April 15, 1969 R. E. KNOWLDEN 3,438,612
PRESSURE DIFFERENTIAL TYPE MIXING DEVICE
Filed Feb. 9, 1967
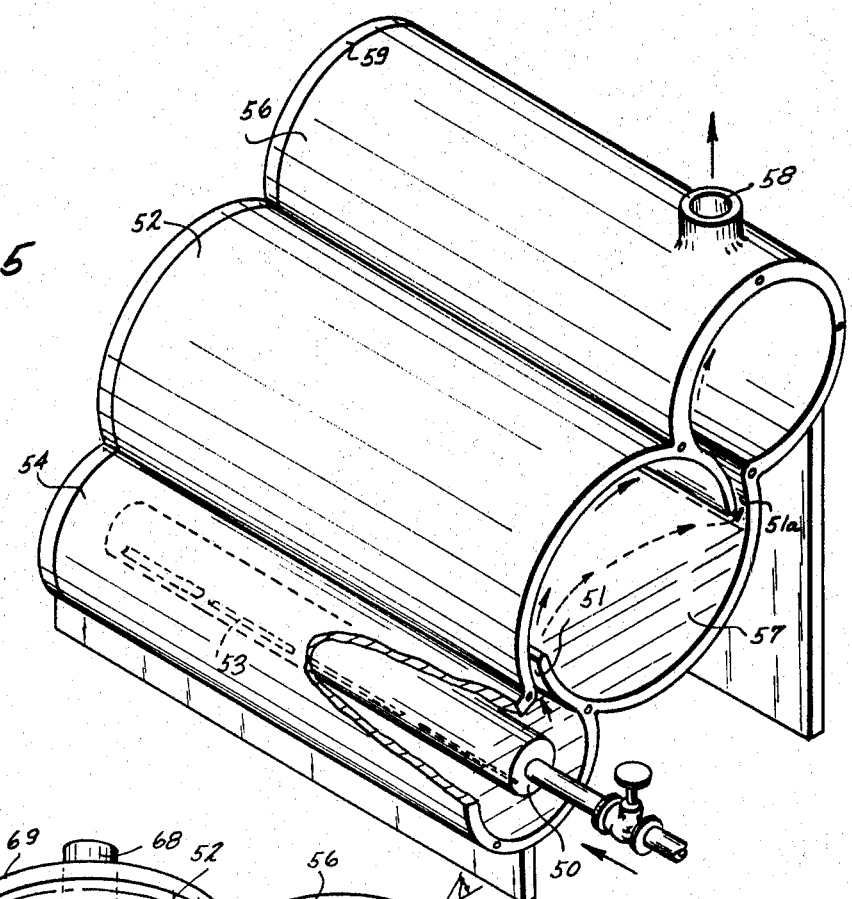
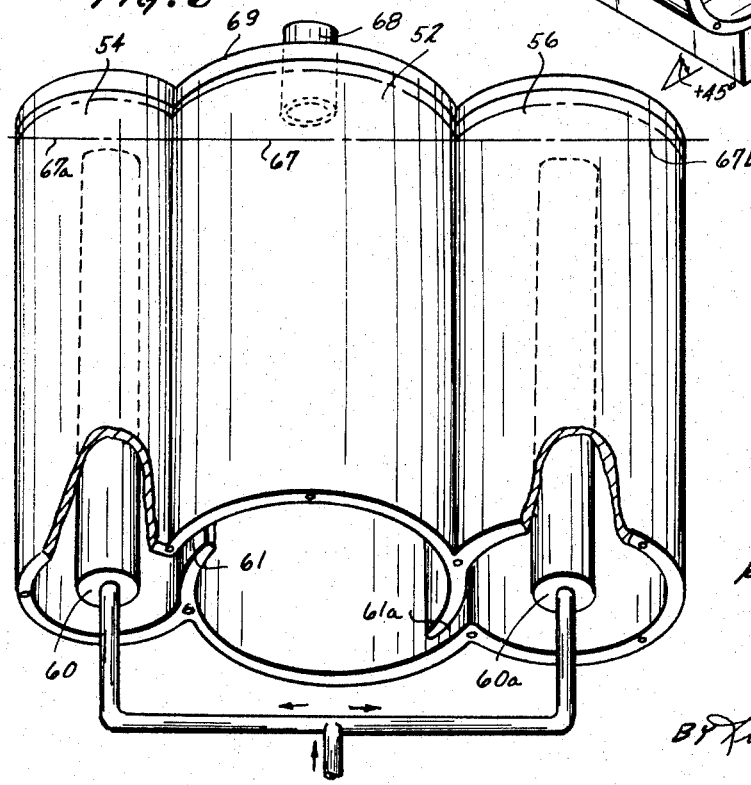
INVENTOR
ROBERT E. KNOWLDEN United States Patent Office 3,438,612
Patented Apr. 15, 1969

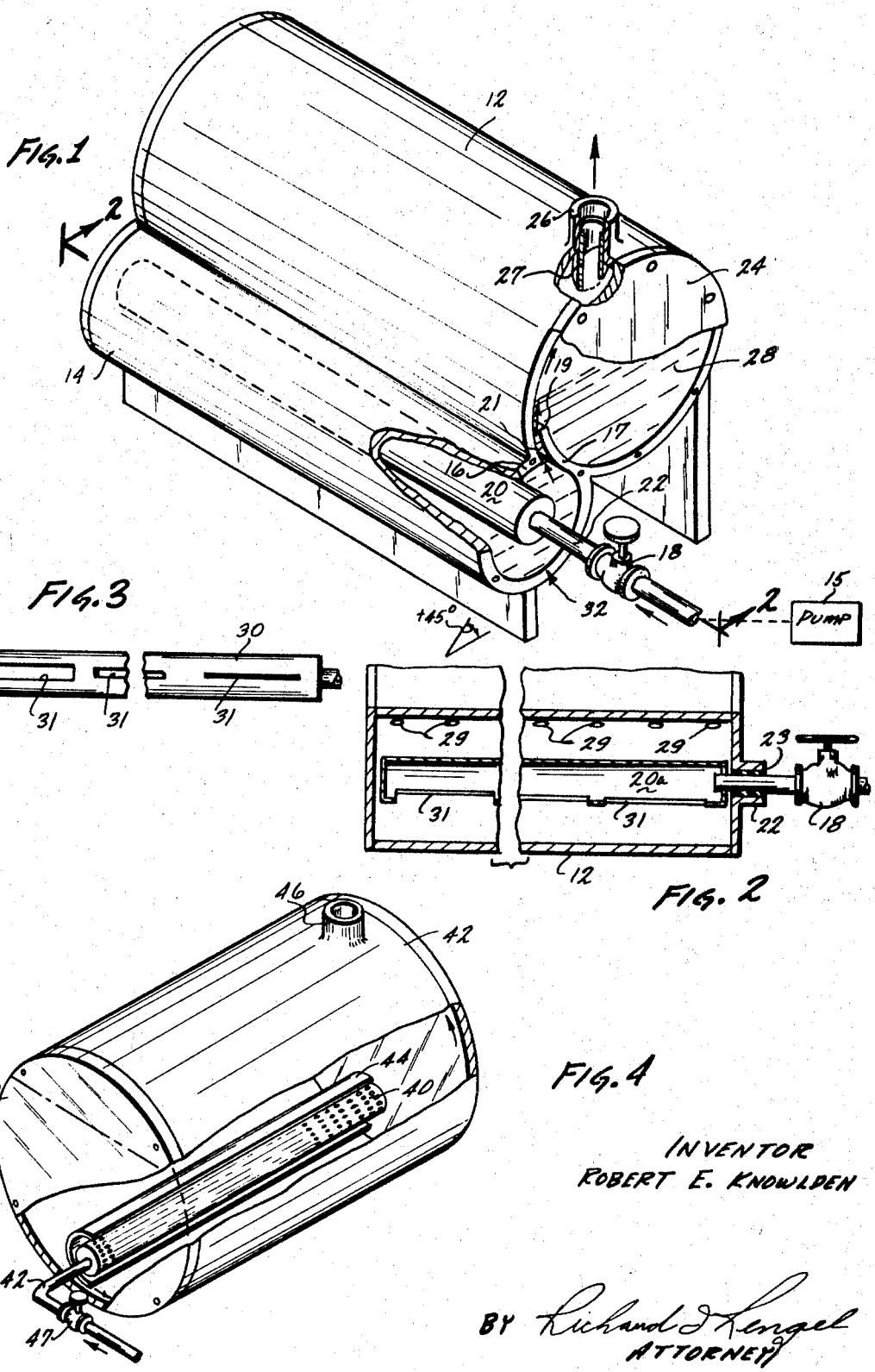

3,438,612
PRESSURE DIFFERENTIAL TYPE
MIXING DEVICE
Robert E. Knowlden, 22712A Nadine Circle,
Torrance, Calif. 90505
Filed Feb. 9, 1967, Ser. No. 614,946
Int. Cl. B01f 7/00, 5/00
U.S. Cl. 259—60                                14 Claims

ABSTRACT OF THE DISCLOSURE

Pressure differential type mixing devices comprising at least one cylindrical chamber containing a fluid and a smaller diameter hollow cylindrical body for introducing another fluid and producing a directed flow of fluids around the interior wall of the chamber to provide a thorough mixing of the fluids in the chamber or in an interconnected cylindrical chamber.

---

The art of mixing is one of the most difficult operations to submit to scientific analysis and, to date, there is no precise method of calculating the degree of thoroughness or speed of mixing under any given set of conditions. It is often erroneously assumed that the thoroughness and speed of mixing is directly proportional to the power or work input to the mixing operation, but in practice, this is not found to be true because of immeasurable interferences resulting from cross currents and eddies, for example, produced in the mixing chamber during mixing operations. For example, a mixing operation often becomes extremely inefficient and a great amount of power input is consumed in producing a very vigorous local action with good mixing only in the zone around the mixing element but with no action at all outside this zone because the power has been dissipated in producing local interferences. In view of the foregoing, the mixing art is an empirical one. This state of the art is also due to the fact that mixing involves an almost infinite variety of substances to be mixed. Accordingly, the number of different types of mixing apparatus that have been developed are enormous wherein various industries have developed mixers peculiar to their own individual use. While it is true that there are different types of mixers which are more suitable for different physical characteristics of the materials to be mixed and no single mixer apparatus is the best for all mixing operations, the fundamental object, in most instances, is to obtain a thorough mixing of a type of materials with a secondary object of minimizing the power expended.

Briefly, the present invention is directed to producing thoroughness in mixing whether for the purpose of producing a blend, dispersion including suspension or emulsion, a solution or chemical reaction of liquids, solids or gases or any combination of these phases. In addition, because of the nature of the present invention, it has the ability of providing for propulsion where the outlet provides a simple and convenient method of directing the force of pressure distributed to one or more of the units, for example, in directing a ship during docking operations where units are provided at fixed locations at predetermined distances alongside the port and starboard sides to provide the desired movements for docking. While the ability of the present invention to provide thoroughness of mixing is not utilized in this application, it does provide a simple method of the discrete use of propulsion for particular circumstances. Further, the nature of the present invention is such that mixing of foods in their preparation by the food industry is enhanced by aeration or purification by the introduction of gases under pressure into the mixing chamber.

The structural arrangement of the present invention is discussed in detail later, however, it should be noted that the thoroughness of mixing is due, in the most part, to its ability to promote uniformity of movement throughout the mixing chamber and avoiding interferences and local action in the zone about a mixer element only. Accordingly, the present invention provides for wide and uniform distribution of mixing action throughout the mixing chamber by providing for cycling of the substances about the chamber in a uniform manner in a cylinder wherein the substances are caused to be moved in a unit only around the walls of the mixing chamber and the power to produce a pressure differential is directed to this uniform movement. The degree of mixing depends upon the particular application and accordingly the time the substances should be involved in the mixing operation will vary. Also, a brief and thorough mixing may be adequate in some substances whereas a longer cycle is often required. The cycle time of the present invention can be varied simply by angular disposition of the unit wherein the mixing action can be lengthened by circulating the substances a number of cycles. For example, in "scrubbing," i.e., purification of air in closed compartments of a submarine, the apparatus of the present invention is angularly disposed to cycle the air in the mixing chamber with the $CO_2$ cleansing liquid by causing the liquid and air to revolve in a circular path about the interior longitudinal walls of the cylindrical chamber.

An object of the present invention therefore, is to provide mixing apparatus having the foregoing features and advantages and overcoming the disadvantages of the prior art in providing thorough mixing.

Other objects and features of the present invention will become apparent to those skilled in the art as the disclosure is made in the following detailed description of the preferred embodiments of the present invention as illustrated in the accompanying sheets of drawings, in which:

FIG. 1 is a perspective view, partly broken away, for showing a preferred embodiment of the pressure differential type mixing device of the present invention;

FIG. 2 is a sectional view of a portion of the lower tank shown in FIG. 1 to show a preferred alternate embodiment of the present invention comprising a slotted body;

FIG. 3 is a detail view of the preferred alternate slotted body shown in FIG. 2;

FIG. 4 is a perspective view of another preferred alternate embodiment of the present invention;

FIG. 5 is a perspective view of another preferred alternate embodiment of the present invention; and FIG. 6 is a perspective view of still another preferred alternate embodiment of the present invention having a plurality of inputs and shown disposed in a vertical position.

Referring now to the drawings wherein like reference numerals refer to like or corresponding parts throughout the several views, FIG. 1 shows the preferred embodiment of the invention to comprise coalescent cylindrical tanks or chambers including an upper tank 12 and a lower tank 14 coalescing along longitudinal edge portions 16 and 17 to provide a common channel 21 interconnecting the interior chambers of the tanks 12 and 14 for passing fluids, liquids, powder or granular materials whenever a pressure differential is produced between tanks 12 and 14 by fluid supplied under pressure from a blower or pump 15 through a one-way control valve 18, for example, as indicated in FIG. 1.

Within the lower tank 14, a cylindrical porous body 20 is shown connected to the valve 18 by a rigid pipe or tube 22 which passes through an inlet 23 provided in the end wall 24 of the lower tank 14, as shown for an alternate slotted body 20a shown in FIG. 2. The porous body 20 comprises a mass of finely divided particles bonded by incipient fusion at their surfaces (sintered) so that the walls of the body 20 have porosity wherein the size of the pores is determined by the size of the particles. Depending upon various factors, such as the amount of turbulence permissible, the porosity is selected to avoid excessive pressure differential between the interior and exterior across the wall of the porous body 20 and preferably sintered material having an average pore size in the range from 50 to 500 microns.

In order to illustrate typical operation of the unit, as shown in FIG. 1, a liquid, e.g., water, is introduced into the dual tanks 12 and 14 through outlet port 26 in the upper wall of tank 12 and the tanks are filled to the level shown in FIG. 1 which is above the channel formed by a lip 19.

The integral dual tank interconnection arrangement and cylindrical curvature of the tanks is very important to the operation of the present invention and therefore, it should be noted that the force exerted by a pressure differential between upper and lower tanks is directed up along the curved interior wall adjacent the protruding lip 19 and around the upper tank 12. This action produces a uniform stirring action throughout upper tank 12 assuming an approximately uniform pressure differential along the length of channel 21. A baffle is inserted in the outlet port 26 to deter water or other liquids or substances except gases to be exited from this port 26.

Uniform pressure differential, while unnecessary in many instances, advantageously provides for uniformity of mixing or aeration of the water or other liquid in the upper tank 12. The disposition of porous body in lower tank 14 inherently provides for uniform distribution of pressure differential along the length of the elongated channel 21. Improved uniformity of pressure differential along the length of channel 21 is provided by gradually increasing the porosity of the porous cylindrical body along the length thereof from the inlet end to the far end. Corresponding improved uniformity of pressure differential is provided with the alternate slotted body 20a by gradually increasing the width of the slots 31 as shown in FIG. 3.

In a typical mode of operation, air under pressure is passed by valve 18 and into the interior of porous body 20 wherein the water has penetrated. The air passed into the interior of the porous body causes a counterflow of fluids (water and air) wherein water mixed with air supplied under pressure from pump 15, flows from the interior of the porous body 20 in very finely divided streams of bubbles and also water flows into the interior of the porous body. The increasing pressure then produced in the lower tank 14, by the introduction of the pressurized air, is distributed uniformly in the lower tank 14 causing a uniform pressure along the channel 21 which forces the aerated water from the lower tank 14 through the channel 21 and upward along the adjacent longitudinal interior portion of the wall of the upper tank 12. The displaced water from the lower tank 14 passing through the channel 21 and now in the upper tank 12 is forced around the interior wall of the upper tank releasing the air through outlet port 26 and returning the water to the opposite longitudinal side of the tank 12. In combination with the upward movement of the water in upper tank 12, adjacent channel 21, the aerated water 28, for example, is caused to circulate uniformly in the upper tank 12 in a circular motion around the interior longitudinal walls of the upper tank 12.

The level of water or other material in the upper tank 12 is maintained at a level above the lip 19 in order to provide a counterflow of water into the lower tank 14, the purpose being to provide intimacy of mixture, primarily in the lower tank 14. Counterflow of water into the lower tank has been found to be improved by ports 29 although they are subject to the pressure differential between chambers of tanks 12 and 14. Further, these ports 29 have not been found to interfere with the primary flow through channel 21. Accordingly, depending upon the pressure differential between tanks, the level of the water is adjusted in upper tank to maintain the lower tank substantially filled with water except for the streams of minute air bubbles, and the lower tank is therefore never completely devoid of water due to air pressure in the lower tank 14.

As shown in FIG. 1, the integral tanks are disposed at an angle of approximately +45° to obtain a thorough but saturated state of the air passing out through the outlet port 26. A more thorough mixing action is obtained by cycling the liquid in the upper tank 12 by means of disposing the angle of the tanks at less than +45° wherein a most thorough mixing is obtained at an angle of −45° (or 315°) wherein 0° is perpendicular and the upper tank is disposed directly above the lower tank 12. In the position of −45°, the water or other low viscosity liquid presently in upper tank 12 forms a circulating layer around the longitudinal walls of upper tank 12 and the air or other gas, e.g., for cleansing, is put through a more vigorous and thorough mixing operation. Either body 20 or 20a can be used wherein porous body 20 provides for filtering of the fluid introduced at the inlet through tube 22.

Referring now to FIG. 4, a single cylindrical tank 42 which continues the functions of coalescent tanks 12 and 14 shown in FIG. 1. As shown in FIG. 4, a porous body 40 corresponds to porous body 20 shown in FIG. 1 and a deflector 44 is provided which directs a counterclockwise flow and mixture of liquid 48 or other substances in the tank 42. The deflector can be eliminated with some reduction in desired flow around the interior of the tank 42 by placement of the porous body 40 to one side of a vertical center line of the tank 42. The flow of liquid is then produced by only the lighter gas introduced in the tank from tube 42 through control valve 47.

Referring now to FIG. 5, three coalescent tanks 52, 54 and 56 are shown in which tanks 52 and 54 correspond to tanks 12 and 14 shown in FIG. 1. The slotted body 50 is shown in detail in FIG. 3 and slots 53 are disposed to direct the fluid, under pressure, in a direction directly away (opposite) from the channel 51. The uppermost tank 56 provides for additional mixing of the exiting fluid passed out of port 58. The fluid in tank 56 also circulates in clockwise direction as the liquid in tank 52 is viewed from the open end thereof. It is understood, of course, that the structure is shown, with the end plate removed only for clarity in showing and would always be properly positioned as the opposite end plate 59 to seal the tanks 52, 54 and 56.

Referring now to FIG. 6, the alternate mixing device is shown in a vertical tank position, i.e., the longitudinal walls are vertical, with the bottom end plate removed for clarity in illustration. The embodiments of FIGS. 1, 4 and 5 can also be disposed in this vertical position.

The embodiment shown in FIG. 6 provides ultimate distribution of differential pressure for uniform clockwise circulation or flow of liquid 67 in the center tank 52. As apparent from the previous description of other embodiments, the clockwise circulation of liquid in the center tank 52 produces a thorough mixing of liquid and any other substances introduced in the tanks through the bodies 60 and 60a or originally placed in the center tank through the removable top end plate 69 or outlet port 68.

The liquids 67a, 67b (substances having liquid-flow characteristics) in the outer tanks 54 and 56 are liquids which are mixed with the liquid 67 in the center tank 52. For example, three different liquids 67, 67a and 67b are provided in the separate tanks 52, 54 and 56, respectively which are mixed in the center tank 52. Mixture of two liquids or merely gaseous sparging of a single liquid and/or liquid and foods or other particulate solids also can be accomplished in the same or similar manner. Inlet ports and outlet ports for the various liquids have not been shown to clarify the operation of the invention, however, it should be evident from the description that supply of liquids 67, 67a and 67b to respective tanks 52, 54 and 56 by inlet ports and output of the mixed liquids would be provided by an exit port below the liquid level in tank 52.

It is to be understood, in view of the foregoing detailed description which does not specifically discuss replenishment of the liquid or liquids in the chamber or chambers, that a suitable supply of the same is coupled to the chamber(s) to replenish the liquid(s) particularly where the exiting of the gas causes diminution of the liquid(s), for example. Also, where the liquid or the like in the chamber becomes saturated with contaminates or otherwise requires continuous or periodic replacement and it is undesirable to interrupt operation during exchange of liquids in the chamber or chambers, circulation of liquid is provided for where in addition to providing a supply of liquid to the chamber by a tube or pipe leading from the supply to the chamber, a drain or outlet at the desired level below liquid level is provided to remove the contaminated liquid in a continuous or periodic manner.

In view of the foregoing description of the preferred embodiments of the present invention, it should now be made clear that a more important advantage thereof is providing substantially greater volume of gases to be forced through the liquid in the chamber without causing discharge of the liquid through the exit port. In prior gas sparging, attempts to increase the speed by forcing of gas through liquids at higher rate, e.g., by higher gas pressure, resulted in forcing liquid out of the chamber. This was due to a lack of an arrangement or configuration and mode of operation for directing and controlling the movement of the liquid in the chamber and also, providing strict requirements on the manner in which the force of the gas is applied and distributed in the chamber and to the liquid as provided by the present invention. It should be noted however that the present invention can be utilized to cause discharge of liquids or discharge of a spray by continuing to increase the pressure differential until this type of operation is obtained. Also whenever the liquid fills the upper chamber, the liquid will be discharged until the level of the liquid is at the level normal for the operation as shown in the drawings. In addition, whenever the level of the liquid is at the proper level and the pressure differential is below normal for maximum volume for desirable operation, the liquid in the mixing chamber may drop back into the body of liquid without circulating along the entire arcuate surface of the upper part of the mixing chamber as described in conjunction with FIG. 1.

What is claimed is:
1. A pressure differential device comprising:
   a first elongated chamber having end walls and a substantially continuous, arcuate side wall to provide a surface for uniform circulation of substances having liquid-flow characteristics in said chamber; means projecting into said chamber and extending between said end walls and approximately parallel to and adjacent said side wall, said means being capable of producing a substantially uniform pressure differential therealong for causing said substances to flow uniformly in the same direction along arcuate paths past at least a section of said side wall extending substantially the entire distance between said end walls and including an arcuate portion of said side wall,
   said means comprising a second, coalescent chamber having end walls and a side wall interconnected to the side wall of said first chamber and forming an elongated inlet to said first chamber and extending substantially the entire distance between said end walls, said side walls of said first and second chambers at said channel including a common arcuate sector and overlapping parallel and concentric side wall sectors of said first chamber which sectors extend substantially between said end walls for directing the flow of said substances along the arcuate interior of the side wall of first chamber.

2. The pressure differential device of claim 1 in which said side walls are substantially horizontal and said first chamber is disposed above said second chamber and the level of said substances is above said channel opening into said first chamber and substantially fills said chamber disposed below said first chamber.

3. The pressure differential device of claim 2 in which said first and second chambers are disposed at an angle in the range of +45° to −45° wherein at 0° the first chamber is disposed directly above said second chamber.

4. The pressure differential device of claim 1 in which said means further includes an elongated first hollow body having apertures therein and extending substantially between said end walls of said second chamber, said hollow body having a plurality of apertures along the length thereof ranging from small apertures near one end to large apertures near the opposite end to provide a uniform distribution of pressure differential along the length of said second chamber and means for coupling a source of fluid under pressure to the interior of said hollow body, and a third elongated chamber having end walls and an arcuate side wall coalescent with the side wall of said first chamber, said second and third chambers forming respective elongated first and second channels with said first chamber at said coalescent side walls; and overlapping side wall sections formed at said channels and in said first chamber extending said channels concentric with said arcuate side wall of said first chamber for directing the flow of said substances about the interior of the side wall of the said first chamber.

5. The pressure differential device of claim 4 in which a second elongated hollow body substantially identical to said first body is disposed in said third chamber and said source of fluid under pressure is also coupled to the interior of said second hollow body to produce a uniform pressure differential along the length of said third chamber.

6. The combination comprising:
   an elongated chamber of approximately cylindrical configuration including a substantially continuous cylindrical side wall for providing a closed circular flow of substances in said chamber, contiguous to said wall for uniform circulation of substances having liquid flow characteristics in said chamber;
   elongated means projecting into said elongated chamber and disposed adjacent said side wall and approximately parallel to the axis of said cylindrical chamber, said elongated means being constructed and arranged to produce an elongated pressure differential interface along the length of said side wall to induce said substances into an elongated movement in a circular flow along said elongated continuous cylindrical side wall of said chamber,
   said elongated means including means for introducing a gas in said elongated means to produce said elongated pressure differential interface between said substances and said gas in which the direction of the pressure differential causes said substances to move in said circular flow and simultnaeously cause intimate intermixture of said substances and gas.

7. The combination of claim 6 in which said elongated chamber is disposed horizontally and said elongated means is disposed and arranged alongside said side wall to direct the force of said elongated pressure differential interface upwardly to produce substantial upward flow of the substances from said interface and along said side wall including the upper portion of said side wall directly above the axis of said elongated cylindrical chamber.

8. The combination of claim 6 in which means are provided to supply said substances to said elongated chamber to maintain the level of said substances above the said elongated pressure differential interface whereby the gas is dispersed in said substances and causes said substances to rise with the gas from the elongated interface.

9. The combination of claim 6 in which said elongated means includes a tubular member having elongated openings extending in the direction of the length of said tubular member to provide for uniform distribution of pressure differential along said interface.

10. The combination of claim 9 in which air supply means are coupled to said tubular member to supply air under pressure into the interior of said member and said air supply means include means for controlling the supply of air thereto.

11. The method of mixing substances having liquid flow characteristics comprising the following steps:
  providing an elongated chamber having a surface curved in a predetermined direction normal to said elongation of said chamber for directing flow of said substances to be mixed along the curved paths formed along the length of said surfaces;
  producing a narrow, elongated gas pressure differential interface extending substantially the length of said elongated chamber and;
  disposing said interface so as to direct the flow of said substances adjacent said elongated interface in a direction away from said interface and along curved paths adjacent said curved surface.

12. The method of claim 11 wherein said pressure differential interface is produced by introducing a gas under pressure along the length of said surface.

13. The method of claim 11 in which the inactive-state level of said substances is maintained above the level of said elongated pressure differential interface in said chamber to assure a continuous gaseous-substances interface; and said interface is disposed in said chamber to produce a unidirectional moment along its length in an upward direction along said curved surface to direct the flow of said substances upwardly along said curved surfaces from said interface whereby the low density of the gas assists in producing flow of the substances and intermixes with the substances simultaneously.

14. The method of claim 11 in which said substances intermixed in said flow are directed in a flow from said chamber which is opposite from the direction of flow of substances in said chamber.

References Cited
UNITED STATES PATENTS

| | | | |
|---|---|---|---|
| 659,278 | 10/1900 | Argerbright | 259—18 |
| 1,650,009 | 11/1927 | Charleston | 259—18 |
| 3,212,757 | 10/1965 | Martin | 259—18 |

ROBERT W. JENKINS, *Primary Examiner.*